UNITED STATES PATENT OFFICE.

WILLIAM M. WELLING, OF NEW YORK, N. Y.

IMPROVED COMPOSITION FOR ARTIFICIAL IVORY.

Specification forming part of Letters Patent No. 89,531, dated April 27, 1869.

*To all whom it may concern:*

Be it known that I, WILLIAM M. WELLING, of the city and State of New York, have invented and made a new and useful Compound Resembling Ivory; and I do hereby declare the following to be a full, clear, and exact description of the same.

I make use of kaolin, in fine powder, about two parts, by weight, to one part, by weight, of shellac, also finely ground. These powders are intimately mixed together, by sifting or otherwise, and a small portion of gum-camphor may be added, if desired.

I then pass the mixture through heated rollers, that melt the shellac, and produce a plastic mass at the same time that the union of the shellac and kaolin is rendered so intimate that the mass is homogeneous, and when pressed into molds while still warm has the appearance of ivory.

Any desired coloring-matter that will mix properly with the shellac and kaolin may be added, either with the kaolin before it is ground and sifted or during the operation of mixing, so as to form articles of different colors.

The molds employed to press articles of this composition should be warm, so that the plastic mass shall not be chilled and set.

What I claim, and desire to secure by Letters Patent, is—

The composition herein specified, prepared substantially as set forth.

In witness whereof I have hereunto set my signature this 11th day of December, 1868.

WM. M. WELLING.

Witnesses:
CHAS. H. SMITH,
GEO. T. PINCKNEY.